United States Patent
Hanawa et al.

(10) Patent No.: US 10,505,187 B2
(45) Date of Patent: Dec. 10, 2019

(54) METHOD OF PRODUCING METAL COMPOUND PARTICLE GROUP, METAL COMPOUND PARTICLE GROUP, AND ELECTRICITY STORAGE DEVICE ELECTRODE CONTAINING METAL COMPOUND PARTICLE GROUP

(71) Applicant: Nippon Chemi-Con Corporation, Shinagawa-ku, Tokyo (JP)

(72) Inventors: Hirotaka Hanawa, Tokyo (JP); Yoshihiro Minato, Tokyo (JP); Satoru Tsumeda, Tokyo (JP); Shuichi Ishimoto, Tokyo (JP); Katsuhiko Naoi, Tokyo (JP); Wako Naoi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 15/535,626

(22) PCT Filed: May 27, 2015

(86) PCT No.: PCT/JP2015/065203
§ 371 (c)(1),
(2) Date: Jun. 13, 2017

(87) PCT Pub. No.: WO2016/098371
PCT Pub. Date: Jun. 23, 2016

(65) Prior Publication Data
US 2017/0346090 A1    Nov. 30, 2017

(30) Foreign Application Priority Data

Dec. 16, 2014 (JP) ................. 2014-254432
Mar. 31, 2015 (JP) ................. 2015-074270

(51) Int. Cl.
| H01M 4/00 | (2006.01) |
| H01M 4/485 | (2010.01) |
| H01G 11/46 | (2013.01) |
| H01G 11/24 | (2013.01) |
| H01G 11/26 | (2013.01) |
| H01G 11/86 | (2013.01) |
| H01M 10/0525 | (2010.01) |
| H01G 11/50 | (2013.01) |
| H01M 4/131 | (2010.01) |
| H01M 4/1391 | (2010.01) |
| C01G 23/00 | (2006.01) |
| H01G 11/06 | (2013.01) |
| H01M 4/02 | (2006.01) |

(52) U.S. Cl.
CPC .......... *H01M 4/485* (2013.01); *C01G 23/005* (2013.01); *H01G 11/24* (2013.01); *H01G 11/26* (2013.01); *H01G 11/46* (2013.01); *H01G 11/50* (2013.01); *H01G 11/86* (2013.01); *H01M 4/131* (2013.01); *H01M 4/1391* (2013.01); *H01M 10/0525* (2013.01); *H01G 11/06* (2013.01); *H01M 2004/021* (2013.01); *Y02E 60/13* (2013.01)

(58) Field of Classification Search
CPC .............................................. H01M 4/48–5825
USPC ......................................... 252/518.1–519.15
See application file for complete search history.

(56) References Cited

U.S. PATENT DOCUMENTS

| 5,881,353 A | 3/1999 | Kamigata et al. |
| 6,482,387 B1 * | 11/2002 | Gulgun ................. C01B 13/185 |
| | | 423/252 |
| 9,287,553 B2 | 3/2016 | Naoi et al. |
| 9,985,273 B2 | 5/2018 | Sun et al. |
| 2007/0126147 A1 | 6/2007 | Fujikawa et al. |
| 2010/0025627 A1 | 2/2010 | Naoi et al. |
| 2012/0217451 A1 * | 8/2012 | Beppu ..................... C01B 25/45 |
| | | 252/506 |

(Continued)

FOREIGN PATENT DOCUMENTS

| CN | 1153491 A | 7/1997 |
| CN | 101937989 A | 1/2011 |

(Continued)

OTHER PUBLICATIONS

International Search Report from International Patent Application No. PCT/JP2015/065203, dated Aug. 11, 2015.

(Continued)

*Primary Examiner* — Steven J Bos
(74) *Attorney, Agent, or Firm* — Shapiro, Gabor and Rosenberger, PLLC

(57) ABSTRACT

An objective of the present disclosure is to provide a method of producing metal compound particle group for an electricity storage device electrode that has an improved rate characteristic, the metal compound particle group, and an electrode formed of the metal compound particle group. The method of producing metal compound particle group applied for an electrode of an electricity storage device, the method includes a step of combining a precursor of metal compound particle with a carbon source to obtain a first composite material, a step of producing the metal compound particle by heat processing the first composite material under a non-oxidizing atmosphere to obtain a second composite material having the metal compound particle combined with carbon, and a step of eliminating carbon by heat processing the second composite material under an oxygen atmosphere to obtain the metal compound particle group having the metal compound particle coupled in a three-dimensional mesh structure.

17 Claims, 10 Drawing Sheets

(56) References Cited

U.S. PATENT DOCUMENTS

| | | |
|---|---|---|
| 2012/0258367 A1 | 10/2012 | Jung et al. |
| 2013/0095384 A1 | 4/2013 | Naoi et al. |
| 2013/0143115 A1 | 6/2013 | Sun et al. |
| 2013/0163145 A1 | 6/2013 | Deng et al. |
| 2014/0186714 A1* | 7/2014 | Kamimura ............. C01B 25/45 429/231.95 |
| 2014/0363568 A1 | 12/2014 | Suematsu et al. |
| 2016/0172124 A1 | 6/2016 | Naoi et al. |

FOREIGN PATENT DOCUMENTS

| | | |
|---|---|---|
| CN | 102844913 A | 12/2012 |
| EP | 2 027 916 A1 | 2/2009 |
| JP | 2004-351608 A | 12/2004 |
| JP | 2006-096651 A | 4/2006 |
| JP | 2007-160151 A | 6/2007 |
| JP | 2012-169217 A | 9/2012 |
| JP | 2013-073854 A | 4/2013 |
| JP | 2013-135214 A | 7/2013 |
| TW | 201327971 A | 7/2013 |
| WO | WO 2004/099067 A1 | 11/2004 |
| WO | WO 2007/066581 A1 | 6/2007 |

OTHER PUBLICATIONS

Pohjalainen Elina et al., "Comparative study of carbon free and carbon containing $Li_4Ti_5O_{12}$ electrodes", Journal of Power Sources, vol. 279, Dec. 12, 2014, pp. 481-486.

Extended European Search Report dated Jul. 4, 2018, in European Patent Application No. EP15869580.9.

Office Action dated May 30, 2018, in Chinese Patent Application No. 201580067141.8.

Office Action dated May 8, 2018, in Japanese Patent Application No. 2015-074270.

Office Action dated Apr. 8, 2019 in Chinese Patent Application No. 201580067141.8.

* cited by examiner

BRIGHT FIELD STEM

METHOD OF PRODUCING METAL COMPOUND PARTICLE GROUP, METAL COMPOUND PARTICLE GROUP, AND ELECTRICITY STORAGE DEVICE ELECTRODE CONTAINING METAL COMPOUND PARTICLE GROUP

TECHNICAL FIELD

The present disclosure relates to a method of producing metal compound particle group for an electrode of an electricity storage device, the metal compound particle group, and an electrode formed of the metal compound particle group.

BACKGROUND ART

Electrodes utilizing metal compound particles are applied to electricity storage devices, such as a lithium ion secondary battery that has a positive electrode and a negative electrode both formed of metal compound particles, and a lithium ion capacitor that has a positive electrode formed of an active charcoal and a negative electrode formed of a material (e.g., graphene or metal compound) that is capable of reversibly absorbing and desorbing lithium ions. These electricity storage devices are applied as power supplies for information devices, such as a mobile phone and a laptop computer, and for in-vehicle regenerative energy purpose. In the in-vehicle application, in particular, high rate characteristics are required.

In order to achieve the high rate characteristics of an electricity storage device, a lithium ion secondary battery positive electrode activation substance (see Patent Document 1), which a surface of a particular lithium containing composite oxide is covered with one type of carbon material selected from carbon nanotube, graphene, and carbon black that has an average dispersion particle diameter of equal to or smaller than 0.2 μm, is known, but this does not yet achieve sufficient charging and discharging characteristics at a high rate.

CITATION LIST

Patent Literatures

Patent Document 1: JP 2012-169217 A

SUMMARY OF INVENTION

Technical Problem

Hence, an objective of the present disclosure is to provide a method of producing metal compound particle group for an electrode of an electricity storage device that has an improved rate characteristic, the metal compound particle group, and an electrode formed of the metal compound particle group.

Solution to Problem

In order to achieve the above objective, a method of producing metal compound particle group applied for an electrode of an electricity storage device, the method includes a step of combining a precursor of metal compound particle with a carbon source to obtain a first composite material, a step of producing the metal compound particle by heat processing the first composite material under a non-oxidizing atmosphere to obtain a second composite material having the metal compound particle combined with carbon, and a step of eliminating carbon by heat processing the second composite material under an oxygen atmosphere to obtain the metal compound particle group. The metal compound particle is coupled in a three-dimensional mesh structure by the heat processing in the step of obtaining the metal compound particle group.

The heat processing temperature in the step of obtaining the second composite material is 600 to 950° C. The heat processing time in the step of obtaining the second composite material is 1 to 20 minutes. The method further includes, prior to the step of obtaining the second composite material, a pre-heating step of heat processing the first composite material under a non-oxidizing atmosphere at 200 to 500° C. The heat processing temperature in the step of obtaining the metal compound particle group is 350 to 800° C. The heat processing temperature in the step of obtaining the metal compound particle group is equal to or higher than the heat processing temperature in the pre-heating step. A left amount of carbon is to be less than 5 wt % of the metal compound particle group by the step of obtaining the metal compound particle group.

The step of obtaining the first composite material is a mechanochemical reaction process of applying shear stress and centrifugal force to a solution that contains a source material of the metal compound particle and the carbon source in a rotating reactor. The source material of the metal compound particle is a titanium source and a lithium source, and the precursor of the metal compound particle is a precursor of lithium titanate. The titanium source contained in the solution is titanium alkoxide, and the solution further contains a reaction suppressing agent that forms a complex with the titanium alkoxide.

The step of obtaining the first composite material is a spray dry process of a solution that contains a source material of the metal compound particle and the carbon source. The solution is obtained by, after adding the carbon source, adding the source material of the metal compound particle.

The step of obtaining the first composite material is a process of stirring a solution that contains a source material of the metal compound particle and the carbon source. The carbon source is polymer. The source material of the metal compound particle has an average particle diameter that is equal to or smaller than 500 nm.

The second composite material has a mixture ratio between the metal compound particle and the carbon that is 95:5 to 30:70 in weight ratio.

In addition, the present disclosure provides a metal compound particle group applied for an electrode of an electricity storage device, in which a metal compound particle in a nano size is coupled in a three-dimensional mesh structure.

In the metal compound particle group, a porosity in a cross-section of the metal compound particle group is 7 to 50%. In a differential pore volume converted from a fine pore distribution measured by a nitrogen gas adsorption scheme from the metal compound particle group formed of the metal compound particle that has an average particle diameter of equal to or smaller than 100 nm, the differential pore volume in a fine pore diameter within a range between 10 to 40 nm has a value equal to or greater than 0.01 cm$^3$/g. In a differential pore volume converted from a fine pore distribution measured by a nitrogen gas adsorption scheme from the metal compound particle group formed of the metal compound particle that has an average particle diameter exceeding 100 nm, the differential pore volume in a fine pore diameter within a range between 20 to 40 nm has a value equal to or greater than 0.0005 cm³/g. The metal compound particle group has a left amount of carbon that is less than 5 wt % of the metal compound particle group. The metal compound particle contained in the metal compound particle group has an average particle diameter of a primary particle that is 5 to 100 nm. The metal compound particle is lithium titanate. In addition, the present disclosure provides an electrode for an electricity storage device, and this electrode includes the above metal compound particle group, and a binder.

As explained above, by performing heat processing under an oxygen atmosphere after the second composite material having the metal compound particle and the carbon combined with each other is obtained, the carbon is eliminated, and the locations where the carbon was present before the heat processing become pores, and the metal compound particles are reacted and coupled with each other by this heat processing, resulting in forming the three-dimensional mesh structure of the metal compound particles by the pore originated from the carbon and the metal compound particles coupled with each other. This metal compound particle group has the moderate pores, and therefore the electrolyte solution enters when an electricity storage device is formed. This achieves a smooth movement of ions in the electrolyte solution within the electrode, and acceleration of the movement of electrons by the coupling of the metal compounds. These effects mutually decrease the resistance of the electrode, thereby improving the rate characteristics.

Advantageous Effects of Invention

By applying the method of producing the metal compound particle group according to the present disclosure and the metal compound particle group thereof, the rate characteristics of an electrode for electricity storage devices can be improved.

DESCRIPTION OF EMBODIMENTS

Figure 1:
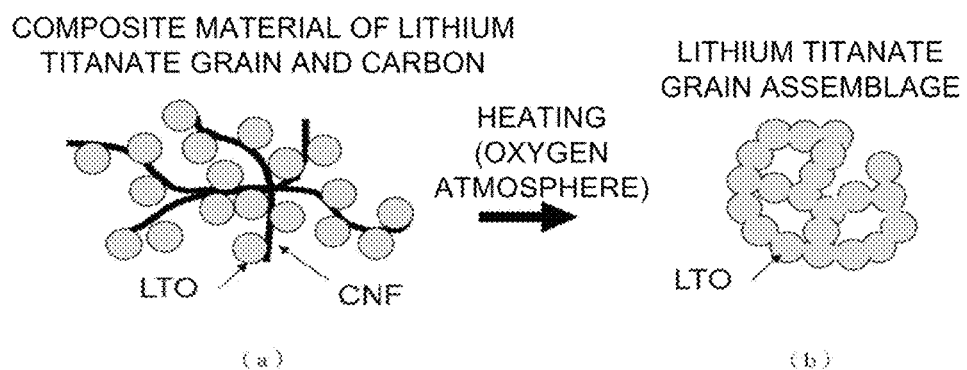
FIG. 1(a) is a conceptual diagram illustrating a second composite material according to the present disclosure.
FIG. 1(b) is a conceptual diagram illustrating metal compound particle group according to the present disclosure.

Embodiments of the present disclosure will be explained below. Note that the present disclosure is not limited to the embodiments to be explained below.

The metal compound particle group according to the present disclosure is mainly applied for an electrode of electricity storage devices, and example metal compound particles that form the metal compound particle group are materials capable of functioning as the positive electrode activation substance or the negative electrode activation substance of electricity storage devices, such as a lithium ion secondary battery and a lithium ion capacitor.

The metal compound particle is an oxide or an oxoate salt that contain lithium, and is represented by $Li_\alpha M_\beta Y_\gamma$. In the case of a metal oxide, for example, M is any of Co, Ni, Mn, Ti, Si, Sn, Al, Zn, and Mg, and Y is O. In the case of a metal oxoate salt, for example, M is any of Fe, Mn, V, Co, and Ni, and Y is any of $PO_4$, $SiO_4$, $BO_3$, and $P_2O_7$. $M_\beta$ may be an alloy of $M_\delta M'_\epsilon$, and for example, M is any of Sn, Sb, and Si, and M' is any of Fe, Co, Mn, V, Ti, and Ni. For example, lithiummanganate, lithium iron phosphate, lithium titanate, lithium cobaltite, vanadium-lithium phosphate, and manganese-lithium iron phosphate are applicable.

The method of producing the metal compound particle group utilized for an electrode of electricity storage devices according to the present disclosure includes the following steps.

(1) A step of combining a precursor of the metal compound particle with a carbon source to obtain a first composite material.

(2) A step of producing the metal compound particle by heat processing the first composite material under a non-oxidizing atmosphere to obtain a second composite material that has the metal compound particle combined with carbon.

(3) A step of eliminating carbon by heat processing the second composite material under an oxygen atmosphere to obtain the metal compound particle group.

(1) Step of Obtaining First Composite Material

In the step of obtaining the first composite material, the precursor of the metal compound particle is combined with the carbon source to obtain the first composite material.

The precursor of the metal compound particle means a substance before the metal compound particle is produced by heat processing. For example, the precursor is $M_\beta Y_\gamma$ or the composition compound thereof (the respective ranges of $M_\beta Y_\gamma$ are the same as the metal compound particle), and also a substance in which a lithium source is added to this $M_\beta Y_\gamma$ or the composition compound thereof.

The source material of the metal compound particle may be in a powder form or dissolved in a solution. In the case of lithium iron phosphate, the precursor of the metal compound particle is produced using source materials, such as an Fe source like iron acetate (II), iron nitrate (II), iron chloride (II) or iron sulfate (II), a phosphoric acid source like phosphoric acid, ammonium dihydrogen phosphate, or diammonium hydrogen phosphate, and carboxylic acid like citric acid, malic acid, or malonic acid.

In the case of the lithium titanate, the precursor of the metal compound particle is produced using source materials, such as a titanium source like titanium alkoxide, and a lithium source like lithium acetate, lithium nitrate, or lithium hydroxide.

In the case of lithium cobaltite, the precursor of the metal compound particle is produced using source materials, such as a lithium source like lithium hydroxide monohydrate, lithium acetate, lithium carbonate, or lithium nitrate, and a cobalt source like cobalt acetates like cobalt acetate tetrahydrate, cobalt nitrate, cobalt sulfate, or cobalt chloride.

The carbon source means carbon itself (in a powder form) or a material that can become carbon by heat processing. The carbon (in the powder form) is not limited to any particular one as long as it is a carbon material that is electrically conductive. Examples are carbon black, such as ketjen black, acetylene black, or channel black, fullerene, carbon nanotube, carbon nanofiber, amorphous carbon, carbon fiber, natural graphite, artificial graphite, graphitized ketjen black, mesoporous carbon, and gas-phase-process carbon fiber. Among these examples, a carbon material that has a particle diameter in a nano size is preferable.

The material that can become carbon by heat processing is an organic substance which can be deposited on the surface of the precursor of the metal compound particle, and which is converted to carbon by a the subsequent heat processing. Example organic substances are poly hydric alcohol (e.g., ethylene glycol), polymer (e.g., poly-vinyl-alcohol, poly-ethylene-glycol, or poly-vinyl-pyrolidone), saccharide (e.g., glucose), and amino acid (e.g., glutamic acid).

The first composite material is obtained by combining these source materials of the metal compound particle with the carbon source, and the composite material utilizes the source material of the metal compound particle in a dissolved form or in a powder form, and also the carbon source that is carbon (in a powder form) or the substance that can become carbon by heat processing.

Example schemes of combining the source material of the metal compound particle with the carbon source are as follows.

(a) Mechanochemical process.
(b) Spray dry process.
(c) Stirring process.
(a) Mechanochemical Process As for a mechanochemical process, at least one kind of the source materials of the metal compound particle and the carbon powder are added into a solvent, and the source material is dissolved in the solvent to obtain a solution.

The solvent is not limited to any particular one as long as it is a liquid that does not adversely effect a reaction, and water, methanol, ethanol, isopropyl alcohol, etc., are preferably applicable. The solvents of equal to or greater than two kinds may be mixed and utilized.

When the precursor reaction of the metal compound particle is a hydrolysis reaction, an example source material in this case is a metal alkoxide M(OR)x. In addition, a reaction suppression agent may be added to the solution as needed. By adding the reaction suppression agent that is a predetermined compound which forms a complex with the metal alkoxide, an excessive progress of the chemical reaction is suppressed. As for the metal alkoxide, by adding the predetermined compound like acetate that forms a complex with the metal alkoxide by 1 to 3 moles relative to the metal alkoxide of 1 mole to form the complex, the reaction is suppressed and controlled. Example substances capable of forming a complex with the metal alkoxide are, in addition to acetate, complexing agents, such as carboxylic acid like citric acid, oxalic acid, formic acid, lactic acid, tartaric acid, fumaric acid, succinic acid, propionic acid, and levulinic acid, amino-poly-carboxylic acid like EDTA, and amino alcohol like triethanolamine.

By applying shear stress and centrifugal force to this solution for mechanochemical reaction, the precursor of the metal compound particle is coupled to the surface of the carbon powder. A process is to apply shear stress and centrifugal force to the solution within a rotating reactor, and a suitable reactor is disclosed in JP 2007-160151 A, FIG. 1, and includes concentric cylinders that is an outer cylinder and an inner cylinder. In a preferable reactor, a through hole is provided in the side surface of the rotatable inner cylinder, while a sheeting is disposed on the opening of the outer cylinder. In the above reactor, it is preferable that a gap between the external surface of the inner cylinder and the internal surface of the outer cylinder is equal to or smaller than 5 mm, and more preferably, equal to or smaller than 2.5 mm. Note that the necessary centrifugal force to form this thin film is equal to or greater than 1500N (kgms$^{-2}$), and preferably, equal to or greater than 70000N (kgms$^{-2}$).

By applying the shear stress and the centrifugal force to the solution that contains the source material of the metal compound particle through the precursor forming step, the first composite material that has the precursor of the metal compound particle and the carbon powder combined with each other is produced.

(b) Spray Dry Process

As for the spray dry process, as a solvent, a solution that contains at least one kind of the source materials of the metal compound particle and the carbon powder is prepared.

The solvent is not limited to any particular one as long as it does not adversely effect the reaction, and water, methanol, ethanol, isopropyl alcohol, etc., are preferably applicable. Solvents of equal to or greater than two kinds may be mixed and applied. In addition, as the source material of the metal compound particle, metal alkoxide M(OR)x is preferable.

The source material of the metal compound particle and the carbon powder are added to the solvent, and the solution is stirred as necessary for an adjustment. As for the spray dry process, first, the carbon powder may be dispersed in the solvent, and then the source material of the metal compound particle may be dispersed. As for the dispersion scheme, the carbon powder may be highly dispersed in the solvent by ultracentrifugal process (a process of applying shear stress and centrifugal force to the powder in the solution), bead mill, and homogenizer, etc.

The solution obtained by dissolving the metal alkoxide that is the source material of the metal compound particle in the solvent in which the carbon powder has been dispersed is subjected to the spray dry process on a substrate, the metal alkoxide is subjected to an oxidization process, and the precursor of the metal compound particle is produced. This precursor is combined with the carbon powder, and the first composite material is obtained. A further source material of the metal compound particle may be added to the composite material as needed to obtain the first composite material. As for the spray dry process, the process is performed at a pressure of substantially 0.1 Mpa and at a temperature which the carbon powder is not burned out. By the spray dry process, the precursor of the metal compound particle that has an average particle diameter of the primary particle within the range between 5 to 300 nm is obtained.

(c) Stirring Process

As for the stirring process, at least one kind of powders that are the source materials of the metal compound particle and the material that is the carbon source which can become carbon by heat processing are added to the solvent, this solution is stirred, and the first composite material that has the material, which can become carbon, deposited on the surface of the source material of the metal compound particle is obtained. The powder that is the source material is preferably a fine particle in a nano level obtained by crushing, etc., beforehand. When a polymer is applied as the material that can become carbon by heat processing, the source material of the metal compound particle may be added to the solvent which the polymer has been added beforehand, and this solution may be stirred. The polymer may be adjusted so as to have the weight in the range between 0.05 to 5 when the weight of the powder that is the source material of the metal compound particle is defined as 1. In addition, by obtaining the average secondary particle diameter of the fine particle which is equal to or smaller than 500 nm, preferably, equal to or smaller than 100 nm, the metal compound particle group that has a small particle diameter can be obtained. In addition, as for the solvent, water, methanol, ethanol, and isopropyl alcohol, etc., are preferably applicable.

(2) Step of Obtaining Second Composite Material

In the step of obtaining the second composite material, by heat processing the first composite material under a non-oxidizing atmosphere, the metal compound particle is produced, and the second composite material that has this metal compound particle and carbon combined with each other is obtained. The reason why the non-oxidizing atmosphere is applied is to suppress a burn-out of the carbon source, and example non-oxidizing atmospheres are an inactive atmosphere and a saturated water vapor atmosphere.

In the step of obtaining the second composite material, the first composite material that has the precursor of the metal compound particle and the carbon source combined with each other is heat processed under a non-oxidizing atmosphere such as vacuum, nitrogen, or argon atmosphere. The precursor of the metal compound particle is grown by this heat processing, and the metal compound particle in a condition combined with the carbon source is produced. In addition, because the heat processing is under a non-oxidizing atmosphere, the carbon source is not likely to be burned out and is present in a condition combined with the metal compound particle, and the second composite material that has the metal compound particle and carbon combined with each other is obtained. As illustrated in FIG. 1(a) that is a conceptual diagram, the second composite material is a composite material that has the metal compound particle (e.g., lithium titanate: LTO) supported on carbon (e.g., carbon nanofiber: CNF), and is considered that LTO is present in a condition dispersed on CNF as a nano size particle.

When the carbon powder is applied as the carbon source contained in the first composite material, by the heat processing under a non-oxidizing atmosphere, the precursor of the metal compound particle on the surface of the carbon powder is reacted at the time of heat processing under the non-oxidizing atmosphere, and is grown on the surface of the carbon powder to form lattice junction. Hence, the carbon powder and the metal compound particle are integrated. When the material that can become carbon by heat processing is applied as the carbon source contained in the first composite material, by the heat processing under the non-oxidizing atmosphere, the material is carbonized on the surface of the precursor of the metal compound particle, and the carbon is produced. Hence, the second composite material that has this carbon combined with the metal compound particle grown by heat processing is produced. In this case, the "carbon" contained in the second composite material means carbon powder or carbon produced by heat processing.

When, as the heat processing under the non-oxidizing atmosphere is performed under the inactive atmosphere, in order to prevent the carbon source from burned out, the temperature is maintained within the range between 600 to 950° C. for 1 to 20 minutes. When the temperature is within this range, excellent metal compound particle is can be obtained, and excellent volume and rate characteristics are can be obtained. When, in particular, the metal compound particle is lithium titanate, and when the temperature of heat processing is less than 600° C., the production of lithium titanate is insufficient which is not preferable, and when the temperature of heat processing exceeds 950° C., lithium titanate is agglutinated and lithium titanate itself is decomposed which is also not preferable. In particular, heat processing under a nitrogen atmosphere is preferable as heat processing under an inactive atmosphere, and nitrogen is doped in the metal compound particle, and the electrical conductivity of the metal compound particle increases. Consequently, rapid charging and discharging characteristics are improved.

When, as the heat processing under the non-oxidizing atmosphere is performed under a saturated water vapor atmosphere, in order to prevent the carbon source from being burned out, the temperature within the range between 110 to 300° C. is maintained for 1 to 8 hours. When the temperature is within this range, excellent metal compound particle can be obtained, and excellent volume and rate characteristics can be obtained. When, in particular, the metal compound particle is lithium cobaltite, and when the temperature of heat processing is less than 110° C., the production of lithium cobaltite is insufficient which is not preferable, and when the temperature of heat processing exceeds 300° C., the carbon source is burned out, and lithium cobaltite is agglutinated which is also not preferable.

It is preferable that the average particle diameter of the primary particle of the metal compound particle obtained by the step of obtaining the second composite material is within the range between 5 to 300 nm. By achieving such nano size fine particle, the porosity of the metal compound particle group to be explained later can be increased, and the number of fine pores present in the metal compound particle group can be increased. In addition, it is preferable that the obtained second composite material has a weight ratio between the metal compound particle and the carbon to be 95:5 to 30:70, and by achieving such ratio within this range, the porosity of the metal compound particle group finally obtained can be increased. In order to achieve such ratio within this range, the mixing ratio between the source material of the metal compound particle and the carbon source may be adjusted beforehand.

Prior to the step of obtaining the second composite material, pre-heat processing of maintaining the first composite material at a temperature range between 200 to 500° C. for 1 to 300 minutes may be performed. This pre-heat processing is desirably performed under a non-oxidizing atmosphere, but when the temperature is less than 300° C. at which the carbon source is not burned out, the pre-heat processing may be performed under an oxygen atmosphere. Depending on the metal compound particle obtained by this pre-heat processing, impurities present in the first composite material maybe eliminated, and a condition in which the precursor of the metal compound particle is uniformly sticking to the carbon source is can be obtained. In addition, there is also an effect that the growth of the precursor of the metal compound particle contained in the first composite material is promoted.

(3) Step of Obtaining Metal Compound Particle group

In the step of obtaining the metal compound particle group, by heat processing the second composite material under an oxygen atmosphere, the carbon is eliminated, and the metal compound particle group is obtained.

Figure 2:
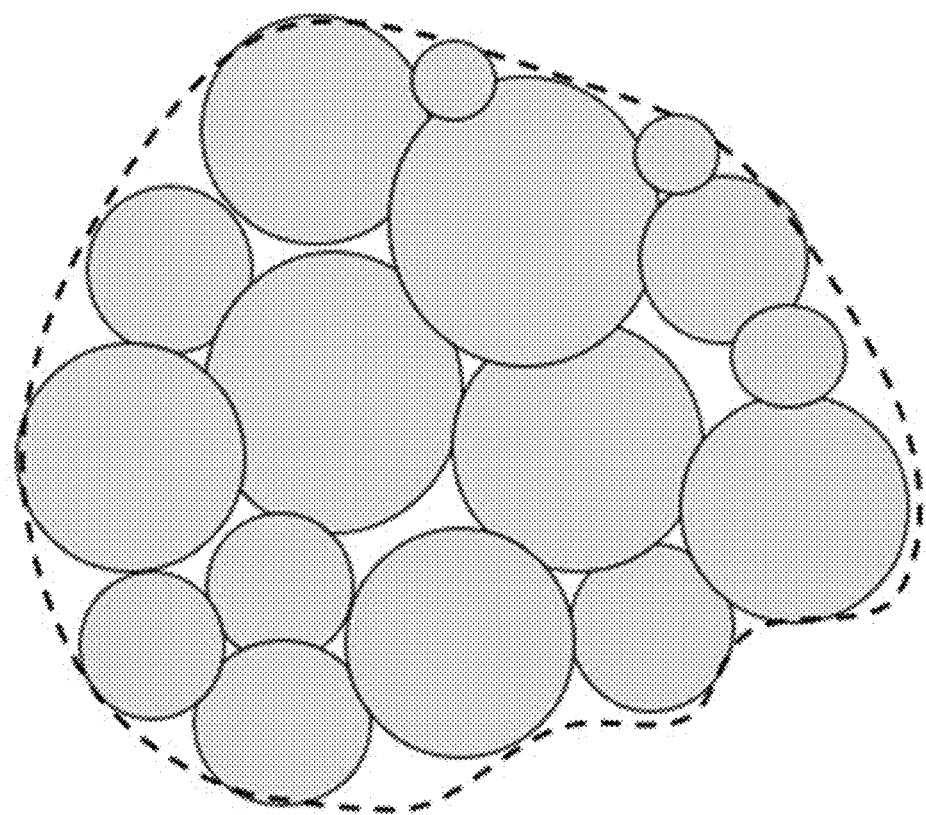
FIG. 2 is a conceptual diagram illustrating a conventional metal compound particle group.

In the step of obtaining the metal compound particle group, heat processing is performed on, under the oxygen atmosphere, the second composite material, that has the nano size metal compound particle, and the carbon combined with each other. The carbon is burned out and eliminated by this heating, and locations where the carbon was present before heat processing become pores. In addition, the metal compound particles are reacted and coupled with each other by this heat processing. Hence, the pores originating from the carbon and the coupling of the metal compound particles together form a three-dimensional mesh structure of the metal compound particle as illustrated in the conceptual diagram that is FIG. 1(b). Since this metal compound particle group has moderate pores, such pores are filled with an electrolyte solution when an electricity storage device is formed. This may achieve a smooth movement of ions in the electrolyte solution in an electrode, acceleration of the movement of electrons due to coupling of the metal compound with each other, and a reduction of the resistance of the electrode due to the synergic action thereof, thereby improving the rate characteristics. In the case of the metal compound particle group produced without applying a carbon source, as illustrated in the conceptual diagram that is FIG. 2, coarse metal compound particles are agglutinated, and the number of pores is little.

In this heat processing, it is preferable that, in order to eliminate the carbon and to cause the metal compound particles to be coupled with each other, the temperature is maintained within the range between equal to or higher than 350° C. and equal to or lower than 800° C., preferably equal to or higher than 400° C. and equal to or lower than 600° C., for equal to or longer than 0.25 hours and equal to or shorter than 24 hours, more preferably equal to or longer than 0.5 hours and equal to or shorter than 10 hours. In particular, in the case of the heat processing under an inactive atmosphere, it is preferable that the temperature is set to be lower than the temperature of the heat processing in the step of obtaining the second composite material. When the temperature less than 350° C., the elimination of the carbon contained in the second composite material becomes insufficient, and when the temperature exceeds 800° C., the agglutination of the metal compound particle is advances too much, reducing the number of pores. When the temperature is within a range between equal to or higher than 400° C. and equal to or lower than 600° C., the metal compound particle maintains the average particle diameter of the primary particle at 5 to 300 nm, and the particle growth from the average particle diameter of the primary particle of the metal compound particle prior to this heat processing is suppressed.

It is preferable that this heat processing is performed at a temperature that is equal to or higher than that of the pre-heat processing. As for the oxygen atmosphere, it may be an atmosphere mixed with nitrogen, and it is preferable that it is under the atmosphere including oxygen of equal to or higher than 15%, like an ambient atmosphere. In the heat processing under the oxygen atmosphere, since the amount of oxygen decreases due to the dissipation of the carbon, oxygen may be supplied to the interior of a heat processing furnace as appropriate.

Next, the metal compound particle group obtained as explained above forms the three-dimensional mesh structure by the coupling of the nano size metal compound particles, and there are nano size fine pores (gaps). It is preferable that the porosity in the cross-section of the metal compound particle group is within the range between 7 to 50%. When the porosity is less than 7%, the area of the metal compound particle that contacts with the electrolyte solution is little, giving an adverse effect to the movement of ions in the electrolyte solution. In addition, when the porosity exceeds 50%, the coupling of the metal compound particles becomes rough, disrupting a formation of the three-dimensional mesh structure. The metal compound particle has an average particle diameter of the primary particle within the range between 5 to 300 nm, and since the metal compound particle is a fine particle within this range, a large number of nano size fine pores can be obtained in the metal compound particle group, and the area of the metal compound particle that contacts with the electrolysis solution increases, achieving a smooth movement of ions in the electrolyte solution. In addition, when the fine pore of this metal compound particle group was measured, it was found that there are a large number of fine pores. In particular, a large number of fine pores that were equal to or lower than 40 nm was present.

For example, in a differential pore volume, which is converted from a pore distribution measured by a nitrogen gas adsorption measurement scheme performed on the metal compound particle group that has an average particle diameter of the primary particle that is equal to or smaller than 100 nm, the differential pore volume in the pore diameter within the range between 10 to 40 nm has a value that is equal to or greater than 0.01 $cm^3/g$, in particular, a value that is equal to or greater than 0.02 $cm^3/g$. When the area of the metal compound particle that contacts with the electrolyte solution increases, and the area of the metal compound particle that contacts with the electrolyte solution becomes larger, the more the rate characteristics improve when applied as an electrode.

In addition, for example, in the differential pore volume, which is converted from a pore distribution measured by a nitrogen gas adsorption measurement scheme performed on the metal compound particle group that has an average particle diameter of the primary particle that exceeds 100 nm, the differential pore volume in the pore diameter within the range between 20 to 40 nm has a value that is equal to or greater than 0.0005 cm$^3$/g. When the area of the metal compound particle that contacts with the electrolyte solution increases, and the area of the metal compound particle that contacts with the electrolyte solution becomes larger, the more the rate characteristics improve when applied as an electrode.

It is preferable that the amount of carbon left in the obtained metal compound particle group is less than 5 wt % relative to the metal compound particle group. In order to eliminate the amount of carbon left, the heat processing temperature and processing time of the step of obtaining the metal compound particle group are adjusted, the carbon contained in the second composite material is eliminated, and the amount of carbon is limited to a quite little amount, so that the reaction between the carbon and the electrolyte solution in the electrode is suppressed, and the characteristics when it is left uncharged is improved. In particular, the amount of carbon of less than 1 wt % is preferable.

The metal compound particle group obtained as explained above is applied for an electrode of electricity storage devices. The metal compound particle group is formed as an electrode for storing electricity energy by kneading and molding the predetermined solvent, a binder, and an electrical conductivity assisting agent like conductive carbon, such as carbon black, acetylene black, ketjen black, or graphite as needed. The electrolyte solution is contained in this electrode, and this electrode is stored in a predetermined container to form an electricity storage device.

Embodiment

The present disclosure will be explained together with following examples, but the present disclosure is not limited to the following examples.

FIRST EXAMPLE 20 g of carbon nanofiber and 245 g of tetra-isopropoxy titanium were added to 1300 g of isopropyl alcohol, and tetra-isopropoxy titanium was dissolved in isopropyl alcohol. The weight ratio between titanium alkoxide and carbon nanofiber was selected in a way that the weight ratio between lithium titanate and carbon nanofiber in the second composite material become substantially 8:2. The obtained solution was introduced into the inner cylinder of a reactor, in which the cylinder includes an outer cylinder and the inner cylinder in a coaxial manner, has a through-hole provided in the side face of the inner cylinder, and has a sheeting disposed on the opening of the outer cylinder. The inner cylinder was rotated for 300 seconds to apply centrifugal force of 35000 kgms$^{-2}$ to the solution, and the carbon nanofiber was highly dispersed in the solution.

165 g of acetic acid and 50 g of lithium acetate were dissolved in a mixture solvent of 145 g of isopropyl alcohol and 150 g of water. The obtained solution was introduced into the inner cylinder of the reactor, and the solution was prepared. The inner cylinder was rotated for 300 seconds to apply centrifugal force of 35000 kgms$^{-2}$ to the solution, and a thin film of the solution was formed on the internal surface of the outer cylinder, while the chemical reaction was advanced by applying the shear stress and the centrifugal force to the solution so that the precursor of the lithium titanate is supported on the carbon nanofiber in a highly dispersed condition.

Next, the contents of the reactor was collected, the solvent was vaporized under an ambient atmosphere, and the contents is further dried for 17 hours at 100° C. The obtained carbon nanofiber supporting the precursor of lithium titanate was subjected to pre-heat processing for 30 minutes at 400° C. under a nitrogen atmosphere, and then subjected to heat processing for 3 minutes at 900° C. under a nitrogen atmosphere. Hence, the second composite material, which has the nano particle of lithium titanate with an average particle diameter of primary particle that is 5 to 20 nm supported on the carbon nanofiber in a highly dispersed condition, was obtained.

100 g of the obtained second composite material was heat processed for 6 hours at 500° C., the carbon nanofiber was burned out and eliminated, and the lithium titanate particles were coupled to obtain the lithium titanate particle group that employs a three-dimensional mesh structure.

SECOND EXAMPLE

In the first example, the weight ratio between lithium titanate and carbon nanofiber in the second composite material was selected to be substantially 8:2, but according to the metal compound particle group according to a second example, the lithium titanate particle group was obtained like the first example except that the weight ratio between lithium titanate and carbon nanofiber in the second composite material was selected to be substantially 7:3.

FIFTH EXAMPLE

First, 20 g of ketjen black, 202 g of Co(CH$_3$COO)$_2$.4H$_2$O, and 3243 g of H$_2$O were mixed and introduced into the inner cylinder of the above reactor, and the inner cylinder was rotated for 5 minutes at a rotation speed of 50 m/s relative to the mixture solution. As for the mixture solution having undergone the first mechanochemical process, 3300 g of an LiHO.H$_2$O (contained at 65 g) solution was added, and the inner cylinder was rotated for 5 minutes at a rotation speed of 50 m/s to perform a second mechanochemical process. In this mechanochemical process, centrifugal force of 66000N (kgms$^{-2}$) was applied. The first and second mechanochemical processes correspond to the step of obtaining the first composite material by causing the precursor of the metal compound to the be supported on the carbon source by mechanochemical process.

Next, as for the pre-heat processing, the obtained solution was rapidly heated to 250° C. under an oxidizing atmosphere like an ambient atmosphere, and maintained at this temperature for 1 hour to perform calcination. After the calcination, H$_2$O, the precursor produced by calcination, and H$_2$O$_2$ were added to an autoclave, maintained for 6 h at 250° C. under a saturated water vapor atmosphere to perform hydrothermal synthesis, and 100 g of the second composite material that contains lithium cobaltite (LiCoO$_2$) and ketjen black was obtained. The pressure at this time was 39.2 atmospheric pressure. This hydrothermal synthesis corresponds to the step of producing the second composite material, which the metal compound particle and the carbon is combined with each other, by heat processing the first composite material under a non-oxidizing atmosphere, and producing the metal compound particle.

Next, 100 g of the obtained second composite material was heat processed for 6 hours at 500° C. to burn out and eliminate ketjen black, and to couple lithium cobaltite particles, and thus the lithium cobaltite particle group employing a three-dimensional mesh structure was obtained.

FIRST CONVENTIONAL EXAMPLE 87 g of titanium oxide (TiO$_2$) crushed so as to be in a nano size (substantially 200 nm) was added to a solution that contains 38 g of lithium hydroxide and 800 g of water, and stirred to obtain a solution. This solution was introduced into a spray dry apparatus, and sprayed and dried to obtain a dried product. The obtained dried product was heat processed for 3 hours at 700° C. under an ambient atmosphere, and the lithium titanate particle group was obtained. That is, the first conventional example relates to the lithium titanate particle group produced without an application of carbon.

SECOND CONVENTIONAL EXAMPLE 45 g of Lithium carbonate ($Li_2CO_3$) and 85 g of tricobalt tetraoxide ($Co_3O_4$), both in a powder form, were dry-mixed. The obtained mixture was loaded in an autoclave together with water ($H_2O$). In the autoclave, those were maintained at 250° C. for 6 hours under a saturated water vapor atmosphere. Consequently, lithium cobaltite ($LiCoO_2$) powder was obtained. That is, the second conventional example relates to the lithium cobaltite particle group produced without an application of carbon.

(Capacitor Evaluation)

Next, to the obtained lithium titanate particle group according to the first and second examples and the first conventional example, and the obtained lithium cobaltite particle group according to the fifth example and the second conventional example, 5 wt % polyvinylidene and an appropriate amount of N-methyl-pyrolidone were added and sufficiently kneaded to form a slurry, and this slurry was applied on an aluminum foil and dried, and thus each electrode was obtained. In addition, using the obtained electrode, an electrolyte solution that was a propylene carbonate solution of 1M of $LiBF_4$, and an active charcoal electrode applied as an opposite electrode were adopted, and thus relative laminate sealed capacitor was formed.

Figure 3:
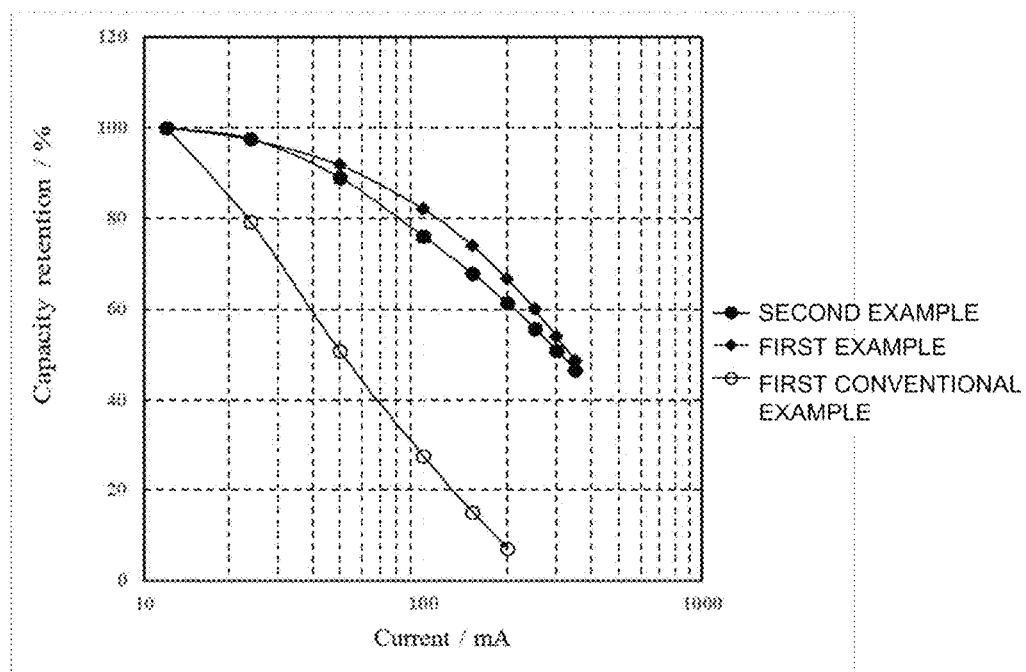
FIG. 3 is a diagram illustrating a rate characteristic of an electrode utilizing metal compound particle group of the present disclosure and conventional technologies, and the metal compound particle group is lithium titanate.
Figure 4:
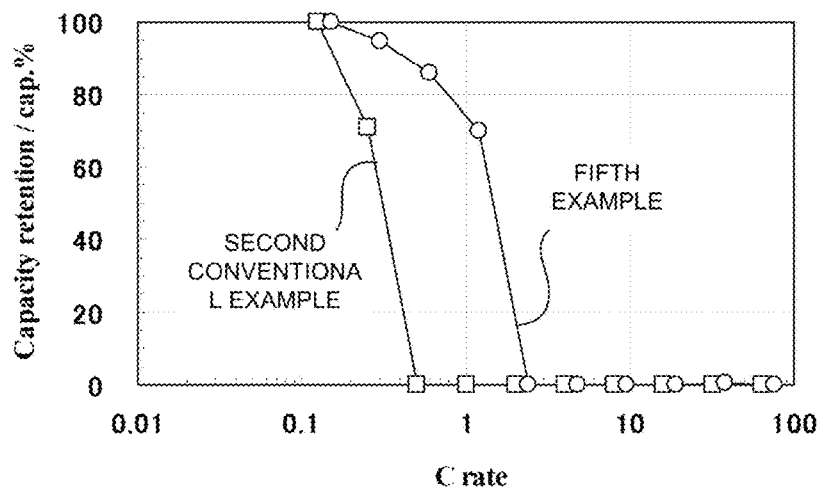
FIG. 4 is a diagram illustrating a rate characteristic of an electrode utilizing the metal compound particle group of the present disclosure and the conventional technologies, and the metal compound particle group is lithium cobaltite.

FIG. 3 is a diagram illustrating, for the obtained capacitor according to the first and second examples and the first conventional example, the relationship between the rate and the capacity retention percentage. FIG. 4 is a diagram illustrating, for the obtained capacitor according to the fifth example and the second conventional example, the relationship between the rate and the capacity retention percentage. As is clear from FIGS. 3 and 4, the capacitor according to the first, second and fifth examples achieves excellent rate characteristics in a high rate. In particular, according to the capacitor of the first, second and fifth examples, such excellent rate characteristics are achieved without conductive carbon that is the electrical conductivity assisting agent in the electrode, and this is a feature of the metal compound particle group according to the present disclosure.

Figure 5:
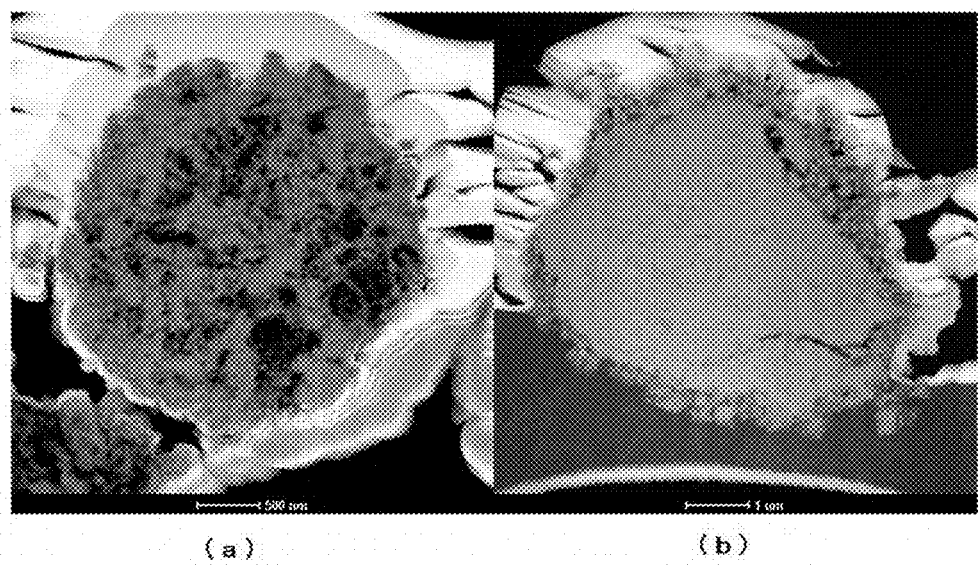
FIG. 5(a) is an STEM photograph of a cross-section of the metal compound particle group of the present disclosure that is lithium titanate.
FIG. 5(b) is an STEM photograph of a cross-section of conventional metal compound particle group.
Figure 6:
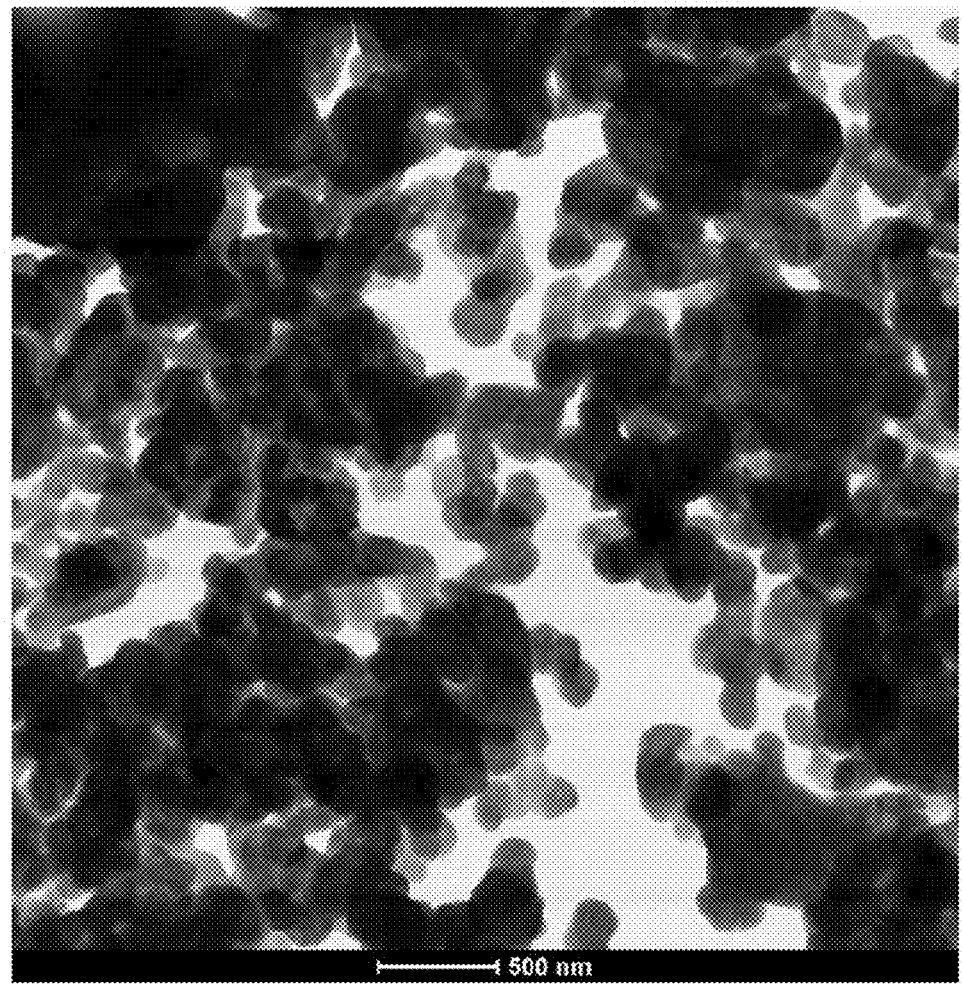
FIG. 6 is an STEM photograph of a cross-section of the metal compound particle group of the present disclosure that is lithium cobaltite.

Next, the obtained lithium titanate particle group was observed. FIG. 5(*a*) is a bright field STEM photograph of the cross-section of the lithium titanate particle group according to the first example, and FIG. 5(*b*) is a bright field STEM photograph of the cross-section of the lithium titanate particle group according to the first conventional example. FIG. 6 is a bright field STEM photograph of the cross-section of the lithium cobaltite particle group according to the fifth example. In FIG. 5(*a*), it is clear that a large number of pores is present in the cross-section of the lithium titanate particle group including the center thereof (in the cross-section, the gray color indicates the lithium titanate particle, while the black color indicates the pore). In addition, in FIG. 6, like the first example, it is clear that a large number of pores is present in the cross-section of the lithium cobaltite particle group including the center thereof. In contrast, as for the lithium titanate particle group according to the first conventional example, only few pores is observed at around the outer circumference of the particle group.

Figure 7:
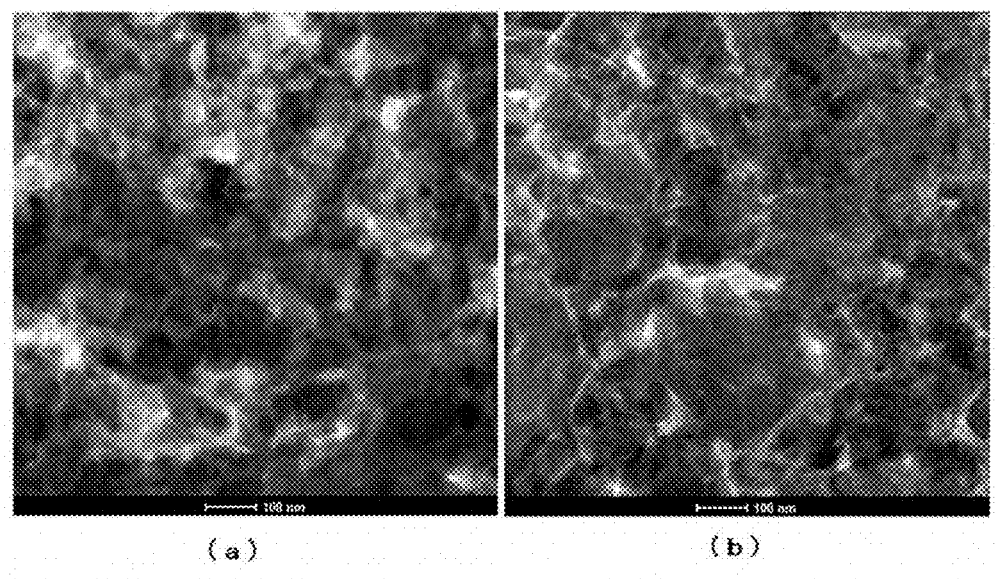
FIG. 7(a) is an STEM photograph of a cross-section of the metal compound particle group of the present disclosure that is lithium titanate.
FIG. 7(b) is an STEM photograph of a cross-section of conventional metal compound particle group.
Figure 8:
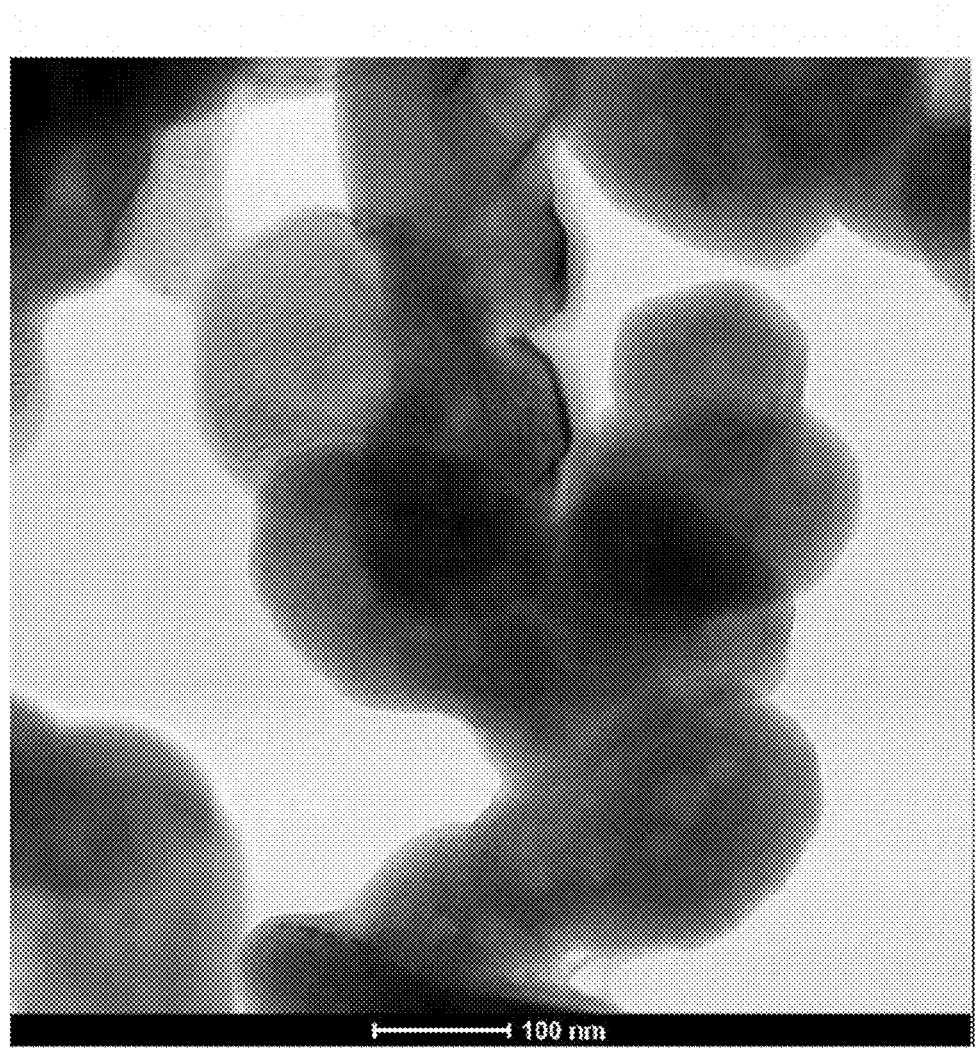
FIG. 8 is an STEM photograph of a cross-section of the metal compound particle group of the present disclosure that is lithium cobaltite.

In addition, FIG. 7 is a blight field STEM photograph of a further enlarged cross-section of the lithium titanate particle group according to the first example and the first conventional example. Still further, FIG. 8 is a blight field STEM photograph of a further enlarged cross-section of the lithium cobaltite particle group according to the third example. The lithium titanate particle group according to the first example in FIG. 7(*a*) and the lithium cobaltite particle group according to the fifth example in FIG. 8 both hardly show a particle boundary between particles (the gray color indicates particle), and the particles are coupled with each other to form the three-dimensional mesh structure. In addition, it is clear that the lithium titanate particle has a particle diameter of the primary particle that is mainly equal to or smaller than 100 nm. On the other hand, in the case of the metal compound particle group according to the first conventional example in FIG. 7(*b*), a contour among particles is shown, and thus it is clear that there is a particle boundary. Still further, it is clear that the particle diameter is mainly equal to or smaller than 200 nm.

Figure 9:
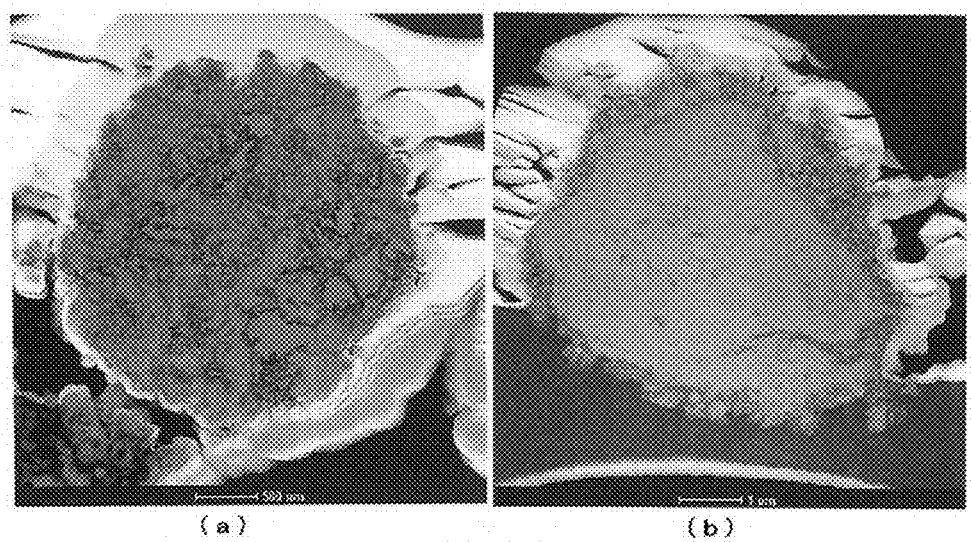
FIG. 9(a) is a diagram illustrating an image analysis result of an STEM photograph of a cross-section of the metal compound particle group according to the present disclosure.
FIG. 9(b) is a diagram illustrating an image analysis result of an STEM photograph of the conventional metal compound particle group.

Next, the pore conditions in the obtained lithium titanate particle group and lithium cobaltite particle group according to the first example, the fifth example, and the first conventional example is checked. The area of the pore in the cross-section of the lithium titanate particle group illustrated in FIG. 5 was analyzed by image processing. As illustrated in FIG. 9, the image processing was performed with the white color in the lithium titanate particle group being the lithium titanate particle, while the gray color being a pore, and the area percentage of the pore in the lithium titanate particle group was calculated.

Consequently, the porosity of the obtained lithium titanate particle group according to the first example illustrated in FIG. 9(*a*) was 22%. In addition, the area of the pore of the cross-section of the lithium cobaltite particle group illustrated in FIG. 6 was also analyzed by image processing like the first example. Consequently, the porosity of the obtained lithium cobaltite particle group according to the fifth example illustrated in FIG. 6 was 9.9%. On the other hand, the porosity of the obtained lithium titanate particle group according to the first conventional example illustrated in FIG. 9(*b*) was 4%. It is clear that the lithium titanate particle group and the lithium cobaltite particle group according to the first example and the fifth example have a high porosity.

Figure 10:
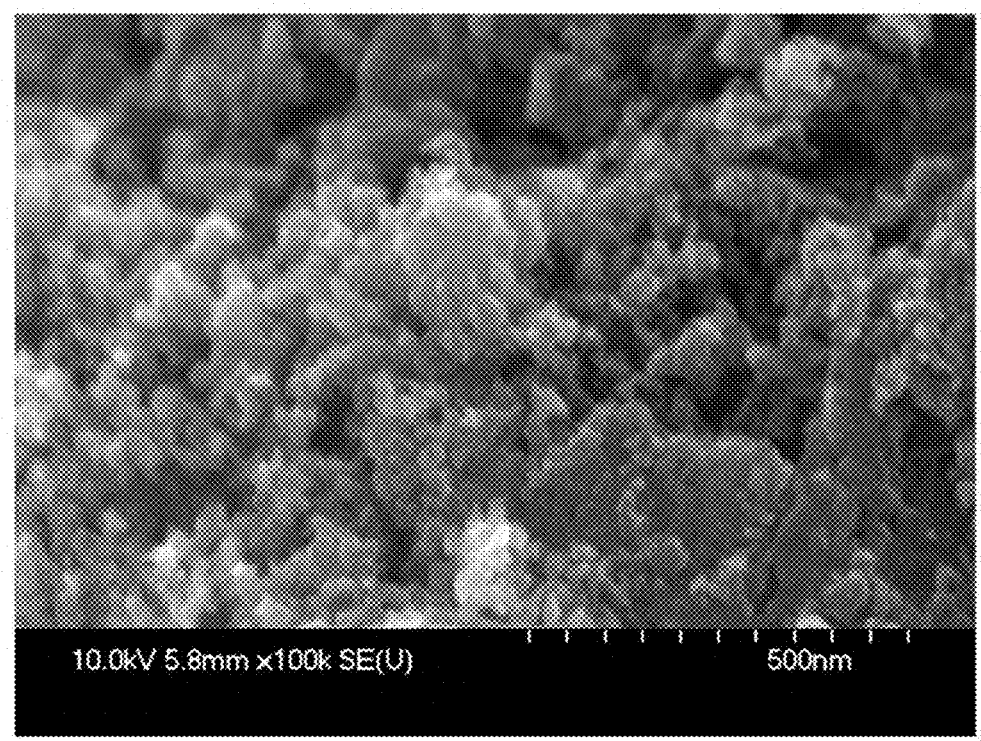
FIG. 10 is an SEM photograph of a surface of the metal compound particle group according to the present disclosure.

FIG. 10 is a hundred-thousand-times magnified SEM photograph of the surface of the obtained lithium titanate particle group. It is clear from FIG. 10 that the surface of the lithium titanate particle group is also a fine particle group in a nano level.

Figure 11:
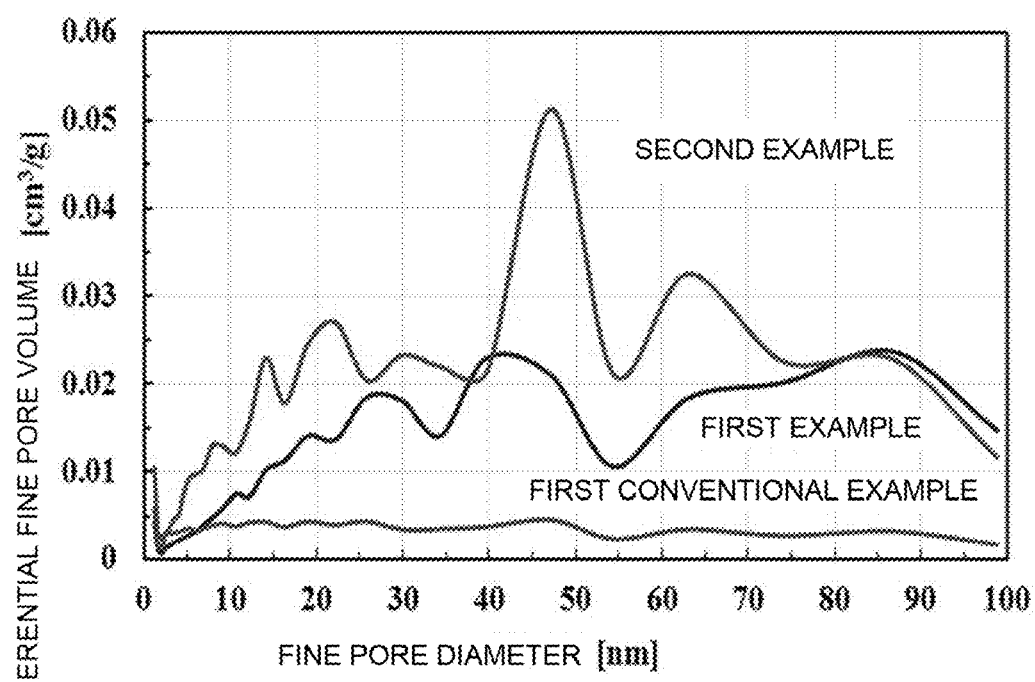
FIG. 11 is a diagram illustrating a differential pore volume of the metal compound particle group according to the present disclosure and conventional technologies, and the metal compound particle group is lithium titanate.
Figure 12:
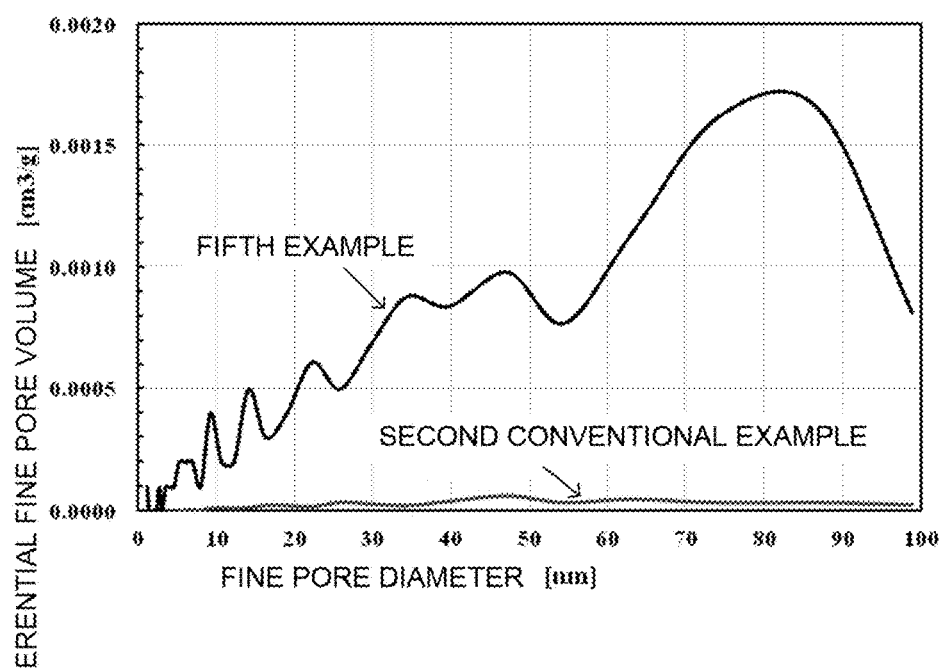
FIG. 12 is a diagram illustrating a differential pore volume of the metal compound particle group according to the present disclosure and conventional technologies, and the metal compound particle group is lithium cobaltite.

Next, the fine pore distribution of the obtained lithium titanate particle group according to the first and second examples and the first conventional example was measured. In addition, the fine pore distribution of the lithium cobaltite particle group according to the fifth example and the second conventional example was also measured. As for the measurement scheme, a nitrogen gas adsorption measurement scheme was applied. More specifically, a nitrogen gas was introduced to the surface of the metal oxide particle and the fine pore formed inside the metal oxide particle surface in which the fine pores communicate with the surface, and the adsorption amount of the nitrogen gas was obtained. Next, the pressure of the introduced nitrogen gas was gradually increased, and the adsorption amount of the nitrogen gas relative to each balanced pressure was plotted to obtain an adsorption isotherm curve. In this example, the measurement was made using a highly precise gas-vapor adsorption amount measurement apparatus BELSORP-max-N (available from Japan BEL Corporation). FIGS. 11 and 12 show a differential pore volume distribution with the horizontal axis being a fine pore diameter, while the vertical axis being an increase in fine pore volume between measurement points. FIG. 11 shows the lithium titanate particle group according to the first and second examples and the first conventional example, and FIG. 12 shows the lithium cobaltite particle group according to the fifth example and the second conventional example.

As is clear from FIG. 11, the lithium titanate particle group according to the first and second examples have a larger differential pore volume than the lithium titanate particle group according to the first conventional example. Within such small range (100 nm) of the fine pore diameter, since the differential pore volume is large, it is clear that the eletrolyte solution enters the interior of the lithium titanate particle group, and the area of the lithium titanate particle in contact with the electrolyte solution is large. In particular, the differential pore volume within the fine pore diameter range between 10 to 40 nm has a value equal to or greater than 0.01 cm$^3$/g, and further equal to or greater than 0.02 cm$^3$/g.

In addition, as is clear from FIG. 12, it is clear that the lithium cobaltite particle group according to the fifth example has a large differential pore volume than the lithium cobaltite particle group according to the second conventional example. Since the differential pore volume within such small range (100 nm) of the fine pore diameter is large, it is clear that the electrolyte solution enters the interior of the lithium cobaltite particle group, and the area of the lithium cobaltite particle in contact with the electrolyte solution is large. In particular, the differential pore volume within the fine pore diameter range between 20 to 40 nm has a value equal to or greater than 0.0005 cm$^3$/g.

Note that the difference in differential pore volume of the lithium titanate particle group according to the first and second example, and that of the lithium cobaltite particle group according to the fifth example may originate from the facts that the average primary particle diameter of the lithium titanate particle group according to the first and second examples is equal to or smaller than 100 nm, while the average primary particle diameter of the lithium cobaltite particle group according to the fifth example exceeds 100 nm. In any cases, in comparison with the case in which the metal compound particle group is produced without an application of carbon, the differential pore volume is increased.

Next, the amount of left carbon in the metal compound particle group according to the present disclosure was checked.

EXAMPLE 1-1

In the first example, although 100 g of the second composite material was heat processed for 6 hours at 500° C., according to the metal compound particle group in an example 1-1, 100 g of the second composite material was processed like the first example to obtain the lithium titanate particle group except that it was heat processed for 3 hours at 350° C.

EXAMPLE 1-2

In the first example, although 100 g of the second composite material was heat processed for 6 hours at 500° C., according to the metal compound particle group in an example 1-2, 100 g of the second composite material was processed like the first example to obtain the lithium titanate particle group except that it was heat processed for 1 hour at 300° C.

The amount of left carbon in the obtained lithium titanate particle group according to the first example, the example 1-1, and the example 1-2 were measured. Note that a TG-DTA measurement (differential heat and thermogravimetric simultaneous measurement) was applied. Table 1 shows results of tests of leaving those examples at 60° C. Note that the leaving test conditions were to hold each capacitor charged at 2.8V for 30 minutes, and then to leave this capacitor for 1500 hours at an atmosphere of 60° C. The discharge capacity when the capacity was charged and discharged again was a value calculated as the rate of the discharging capacity prior to the test. As shown in Table 1, it is preferable that the amount of left carbon is less than 5 wt %, and in particular, the first example in which the amount of left carbon was less than 1 wt % was obtained as a good result.

TABLE 1

|  | Amount of Carbon Left | Left Test |
| --- | --- | --- |
| First Example | Equal to or less than 1% | 83% |
| Example 1-1 | 3% | 72% |
| Example 1-2 | 5% | 66% |

Figure 13:
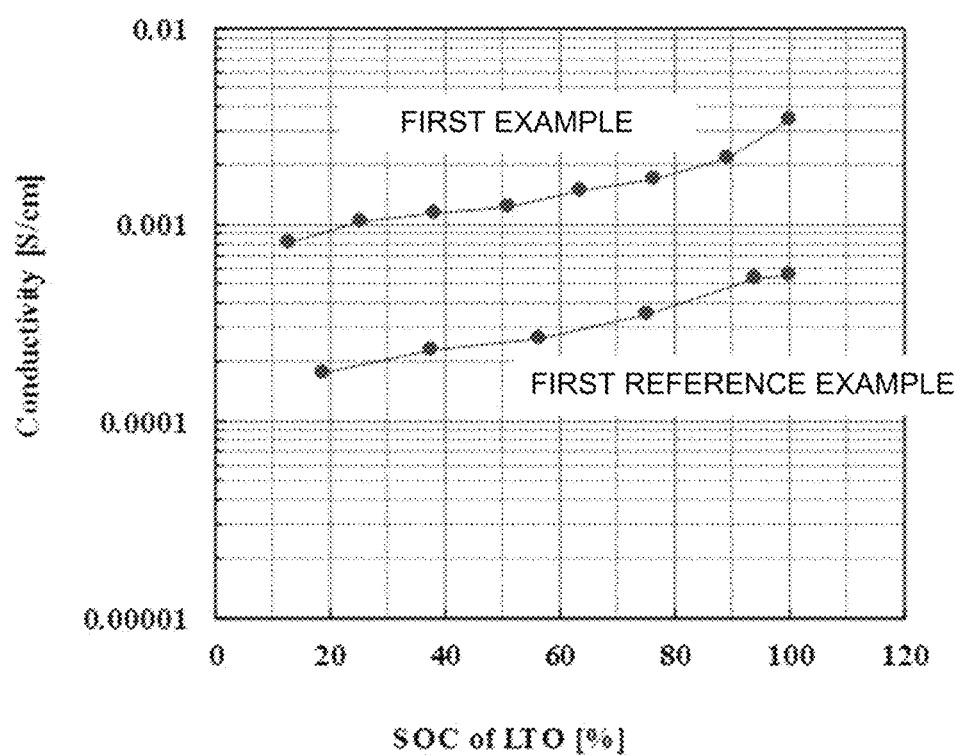
FIG. 13 is a diagram illustrating an electrical conductivity of the metal compound particle group according to the present disclosure and a reference example.

Next, the conductive property of the metal compound particle group according to the present disclosure was checked. The metal compound particle group according to the present disclosure has the metal particles coupled with each other, and thus the conductive property of the particle group is high. In FIG. 13, the metal compound particle group according to the first example, and the metal compound particle group obtained by crushing the metal compound particle group of the first example by a ball mill for 1 minute as a first reference example, are used to produce an electrode sheet, and the electrical conductivity of the electrode was measured, and the result is shown.

As for the production procedure of the electrode sheet, to mixtures of the lithium titanate particle group of the first example and the first reference example, and a binder that was polytetrafluoroethylene (PTFE) were mixed at the weight ratio of 10:1, an appropriate amount of isopropyl alcohol was added and mixed with, and an electrode sheet that had a thickness of 150 to 180 µm was prepared by roll pressing. The produced electrode sheet was held by stainless meshes to form a working electrode, and a lithium foil was applied as an opposing electrode via a separator, and propylene carbonate solution that was LiBF$_4$ of 1M was applied as an electrolyte solution. As for the measurement condition, charging was performed at a current of substantially 0.05 C, and the impedance of the electrode sheet was measured as appropriate. Note that the utilization rate (SOC) of the lithium titanate particle group was calculated from a time needed for a full charging.

As shown in FIG. 13, the electrode sheet according to the first example shows an excellent electrical conductivity regardless of the utilization rate. on the other hand, according to the first reference example obtained by crushing the lithium titanate particle group of the first example, it is clear that the electrical conductivity decreased. This may be because the three-dimensional mesh structure of the lithium titanate particle group was partially collapsed by crushing, and electron passes among the particles was decreased, resulting in the resistance to increase. That is, it is indicated that, in the lithium titanate particle group of the first example, he three-dimensional mesh structure was formed by particles coupled with each other.

THIRD EXAMPLE 20 g of ketjen black was added to 1200 g of isopropyl alcohol and dispersed by ultracentrifugal process, and 247 g of tetra-isopropoxy titanium was added and dissolved to obtain a solution. The weight ratio between titanium alkoxide and ketjen black was selected in such way that, the weight ratio between lithium titanate and ketjen black become substantially 8:2 in the second composite material. The obtained solution was introduced in a spray dry apparatus (ADL-311: available from YAMATO Scientific Co., Ltd.), and was sprayed on a substrate and dried (pressure: 0.1 Mpa, temperature: 150° C.) to obtain a dried material. This dried material was added to 200 g of water in which 52 g of lithium acetate was dissolved, stirred and dried to obtain a mixture. This mixture was the first composite material having the precursor of the metal compound particle, which was produced by oxidization process on the metal alkoxide, and the carbon powders combined with each other.

Next, 100 g of the obtained first composite material was pre-heat processed under a nitrogen atmosphere for 30 minutes at 400° C., and then heat processed under a nitrogen atmosphere for 3 minutes at 900° C., and thus the second composite material having the nano particle of lithium titanate with an average particle diameter of the primary particle that was 5 to 20 nm supported on the ketjen black in a highly dispersed condition was obtained.

100 g of the obtained second composite material of 100 g was heat processed for 6 hours under an ambient atmosphere at 500° C. to burn out and eliminate the carbon nanofiber, and the lithium titanate was coupled to obtain the lithium titanate particle group with a three-dimensional mesh structure. The average particle diameter of the primary particle of the metal compound particle in the obtained particle group was 5 to 100 nm. In addition, when the amount of left carbon in this metal compound particle group was measured, it was equal to or less than 1 wt %.

FOURTH EXAMPLE 87 g of oxidized titanium ($TiO_2$) in a nano size (average particle diameter: 5 to 20 nm), 87 g of polyvinyl alcohol, and 60 g of lithium acetate were added to 800 g of water. The first composite material having polyvinyl alcohol deposited on the surface of the precursor of the metal compound particle obtained by drying this solution was obtained.

Next, 100 g of the obtained first composite material was pre-heat processed for 30 minutes at 400° C. under a nitrogen atmosphere, and heat processed for 3 minutes at 900° C. under a nitrogen atmosphere, and the second composite material having the nano particle of lithium titanate of 5 to 20 nm supported on the carbon originating from polyvinyl alcohol in a highly dispersed condition was obtained. In this second composite material, the weight ratio between the lithium titanate particle and the carbon was substantially 9:1.

100 g of the obtained second composite material was heat processed for 6 hours under an ambient atmosphere at 500° C. to burn out and eliminate the carbon, and the lithium titanate was coupled to obtain the lithium titanate particle group with a three-dimensional mesh structure. The average particle diameter of the primary particle of the metal compound particle in the obtained particle group was 5 to 100 nm. In addition, when the amount of left carbon in this metal compound particle group was measured, it was equal to or less than 1 wt %.

(Half-Cell Evaluation)

Next, the obtained lithium titanate particle group of the third example and the fourth example and the first conventional example, poly-vinylidene fluorine of 5 wt %, and an appropriate amount of N-methyl pyrolidone were added together, sufficiently kneaded to form a slurry, the slurry was applied on an aluminum foil, and dried to obtain an electrode. In addition, using the obtained electrode, with an electrolyte solution that was a propylene carbonate solution which was $LiBF_4$ of 1M, a laminate sealed half cell was produced using an opposing electrode that was a lithium plate.

Figure 14:
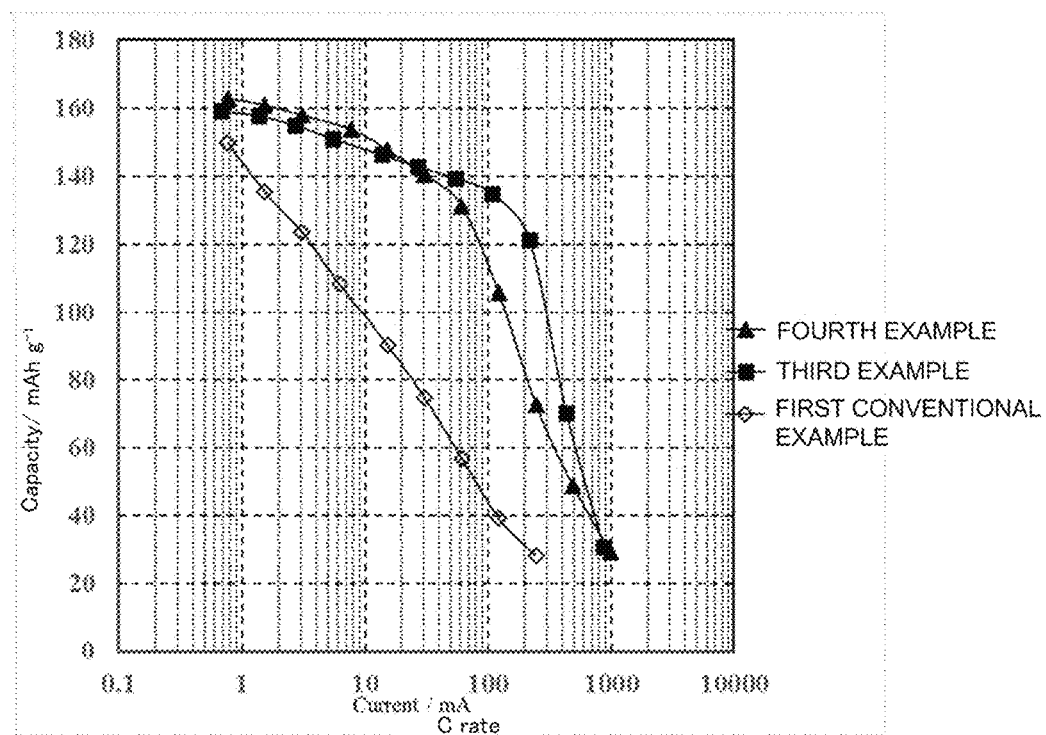
FIG. 14 is a diagram illustrating a rate characteristic of an electrode formed of the metal compound particle group according to the present disclosure and conventional technologies.

FIG. 14 shows a relationship between a charging and discharging current and a capacity retention percentage for the obtained half cell according to the third and fourth examples, and the first conventional example. As is clear from FIG. 14, the half cell according to the third and fourth examples is capable of obtaining excellent rate characteristics in a high rate. In particular, the half cell of the third and fourth examples obtain such excellent rate characteristics although no conductive carbon is contained in the electrode. This is a feature of the metal compound particle group according to the present disclosure.

Next, the obtained fine pore distribution of the lithium titanate particle group according to the fourth example was measured. As for the measurement scheme, a nitrogen gas adsorption measurement scheme was applied. The measurement conditions were the same as those shown in FIG. 11 and FIG. 12, and FIG. 15 shows an obtained differential pore volume distribution.

Figure 15:
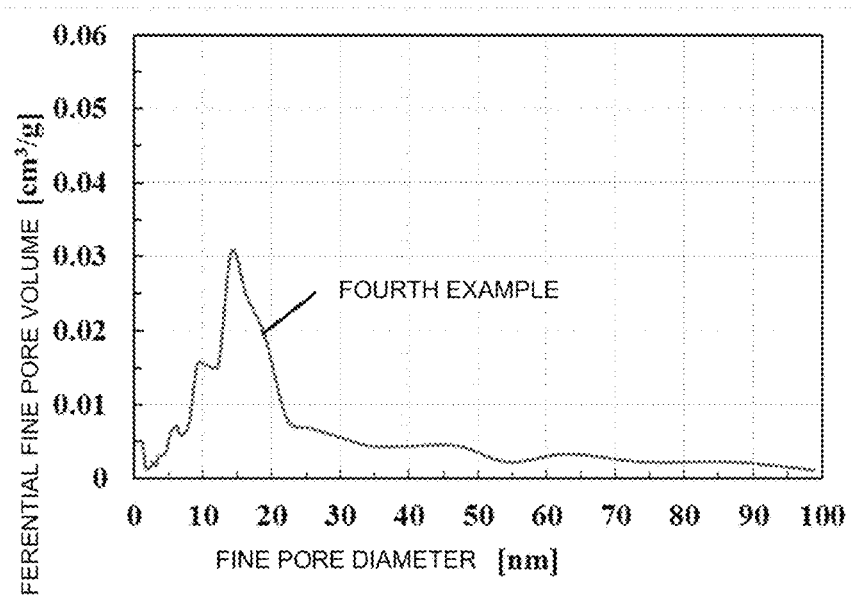
FIG. 15 is a diagram illustrating a differential pore volume of the metal compound particle group according to the present disclosure.

As is clear from FIG. 15, the lithium titanate particle group according to the fourth example has a large differential pore volume like the first and second examples. Since the differential pore volume within such small range (100 nm) of the fine pore diameter is large, it is clear that the electrolyte solution enters the interior of the lithium titanate particle group, and the area of the lithium titanate particle group in contact with the electrolyte solution is large. In particular, the differential pore volume at the fine pore diameter within the range between 10 to 40 nm has a value equal to or greater than 0.01 $cm^3/g$, and this value exceeds 0.03 $cm^3/g$. Likewise, when the fine pore volume distribution was obtained for the lithium titanate particle group according to the third example, it is clear that, like the first and second examples, the differential pore volume is large (illustration omitted). In particular, the differential pore volume at the fine pore diameter within the range between 10 to 40 nm has a value equal to or greater than 0.01 $cm^3/g$, and this value exceeds 0.02 $cm^3/g$.

The invention claimed is:

1. A method of producing a metal compound particle group for an electrode of an electricity storage device, the method comprising:
   a step of combining a precursor of metal compound particle with a carbon source to obtain a first composite material;
   a step of producing the metal compound particle by processing the first composite material with heat under a non-oxidizing atmosphere to obtain a second composite material having the metal compound particle combined with carbon; and a step of eliminating carbon by processing the second composite material with heat under an oxygen atmosphere to obtain the metal compound particle group.

2. The metal compound particle group producing method according to claim 1, wherein the metal compound particle is coupled in a three-dimensional mesh structure by the processing in the step of obtaining the metal compound particle group.

3. The metal compound particle group producing method according to claim 1, wherein a processing temperature in the step of obtaining the second composite material is 600 to 950° C.

4. The metal compound particle group producing method according to claim 1, wherein a processing time in the step of obtaining the second composite material is 1 to 20 minutes.

5. The metal compound particle group producing method according to claim 1, further comprising, prior to the step of obtaining the second composite material, a step of pre-processing the first composite material with heat under a non-oxidizing atmosphere at 200 to 500° C.

6. The metal compound particle group producing method according to claim 1, wherein a processing temperature in the step of obtaining the metal compound particle group is 350 to 800° C.

7. The metal compound particle group producing method according to claim 5, wherein a processing temperature in the step of obtaining the metal compound particle group is equal to or higher than a processing temperature in a pre-processing step.

8. The metal compound particle group producing method according to claim 1, wherein the amount of carbon left in the obtained compound particle group is less than 5 wt % of the metal compound particle group.

9. The metal compound particle group producing method according to claim 1, wherein the step of obtaining the first composite material is a mechanochemical reaction process of applying shear stress and centrifugal force to a solution that contains a source material of the metal compound particle and the carbon source in a rotating reactor.

10. The metal compound particle group producing method according to claim 9, wherein the source material of the metal compound particle is a titanium source and a lithium source, and the precursor of the metal compound particle is a precursor of lithium titanate.

11. The metal compound particle group producing method according to claim 9, wherein a titanium source contained in the solution is titanium alkoxide, and the solution further contains a reaction suppressing agent that forms a complex with the titanium alkoxide.

12. The metal compound particle group producing method according to claim 1, wherein the step of obtaining the first composite material is a spray dry process of a solution that contains a source material of the metal compound particle and the carbon source.

13. The metal compound particle group producing method according to claim 12, wherein the solution is obtained by, after adding the carbon source, adding the source material of the metal compound particle.

14. The metal compound particle group producing method according to claim 1, wherein the step of obtaining the first composite material is a process of stirring a solution that contains a source material of the metal compound particle and the carbon source.

15. The metal compound particle group producing method according to claim 14, wherein the carbon source is polymer.

16. The metal compound particle group producing method according to claim 14, wherein the source material of the metal compound particle has an average particle diameter of a primary particle that is equal to or smaller than 500 nm.

17. The metal compound particle group producing method according to claim 1, wherein the second composite material has a mixture ratio between the metal compound particle and the carbon that is 95:5 to 30:70 in weight ratio.

* * * * *